United States Patent
Hehl

(10) Patent No.: US 7,217,383 B2
(45) Date of Patent: May 15, 2007

(54) MOLD CLOSING DEVICE WITH MOLD HEIGHT ADJUSTMENT AND METHOD FOR ACTUATION THEREOF

(76) Inventor: Karl Hehl, Arthur-Hehl-Strasse, D-72290, Lossburg (DE)

( * ) Notice: Subject to any disclaimer, the term of this patent is extended or adjusted under 35 U.S.C. 154(b) by 434 days.

(21) Appl. No.: 10/506,343

(22) PCT Filed: Dec. 10, 2002

(86) PCT No.: PCT/EP02/13981

§ 371 (c)(1),
(2), (4) Date: Sep. 1, 2004

(87) PCT Pub. No.: WO03/076161

PCT Pub. Date: Sep. 18, 2003

(65) Prior Publication Data

US 2005/0214406 A1 Sep. 29, 2005

(30) Foreign Application Priority Data

Mar. 12, 2002 (DE) .................................. 102 10 869

(51) Int. Cl.
*B29C 45/64* (2006.01)

(52) U.S. Cl. .................... 264/328.1; 425/150; 425/589; 425/595

(58) Field of Classification Search ................ 425/589, 425/595, 150; 264/328.1
See application file for complete search history.

(56) References Cited

U.S. PATENT DOCUMENTS

| 4,281,977 A | | 8/1981 | Farrell |
| 4,341,511 A | * | 7/1982 | Laurent et al. ............. 425/150 |
| 5,275,550 A | * | 1/1994 | Romi ........................ 425/589 |
| 6,655,949 B2 | * | 12/2003 | Chikazawa et al. ......... 425/190 |

FOREIGN PATENT DOCUMENTS

| DE | 198 12 741 | | 9/1999 |
| DE | 19945287 | * | 3/2001 |

OTHER PUBLICATIONS

Brochure for "DUO" by Engel Vertriebsgesellschaft m.b.H.-A-4311 Schwertberg, Austria.
Brochure for "Moduline E-Series Machines" by Husky, Sep. 1996.
International Search Report for International Application No. PCT/EP02/13981 dated May 8, 2003.

* cited by examiner

*Primary Examiner*—Jill L. Heitbrink
(74) *Attorney, Agent, or Firm*—Cantor Colburn LLP

(57) ABSTRACT

A mold height adjustment device for modifying the distance between the stationary mold carrier and a support element by means of a drive mechanism is provided in a plastic injection molding machining. A locking device locks the support element in its respective position. A release position is provided in the area of movement of the moving mold carrier, which unlocks the locking device when the moving mold carrier is in the release position, thereby providing a mold height adjustment device and a method for actuating the device, which advantageously uses the elements moving on the machine for its actuation.

18 Claims, 4 Drawing Sheets

MOLD CLOSING DEVICE WITH MOLD HEIGHT ADJUSTMENT AND METHOD FOR ACTUATION THEREOF

REFERENCE TO RELATED APPLICATIONS

Figure 1:
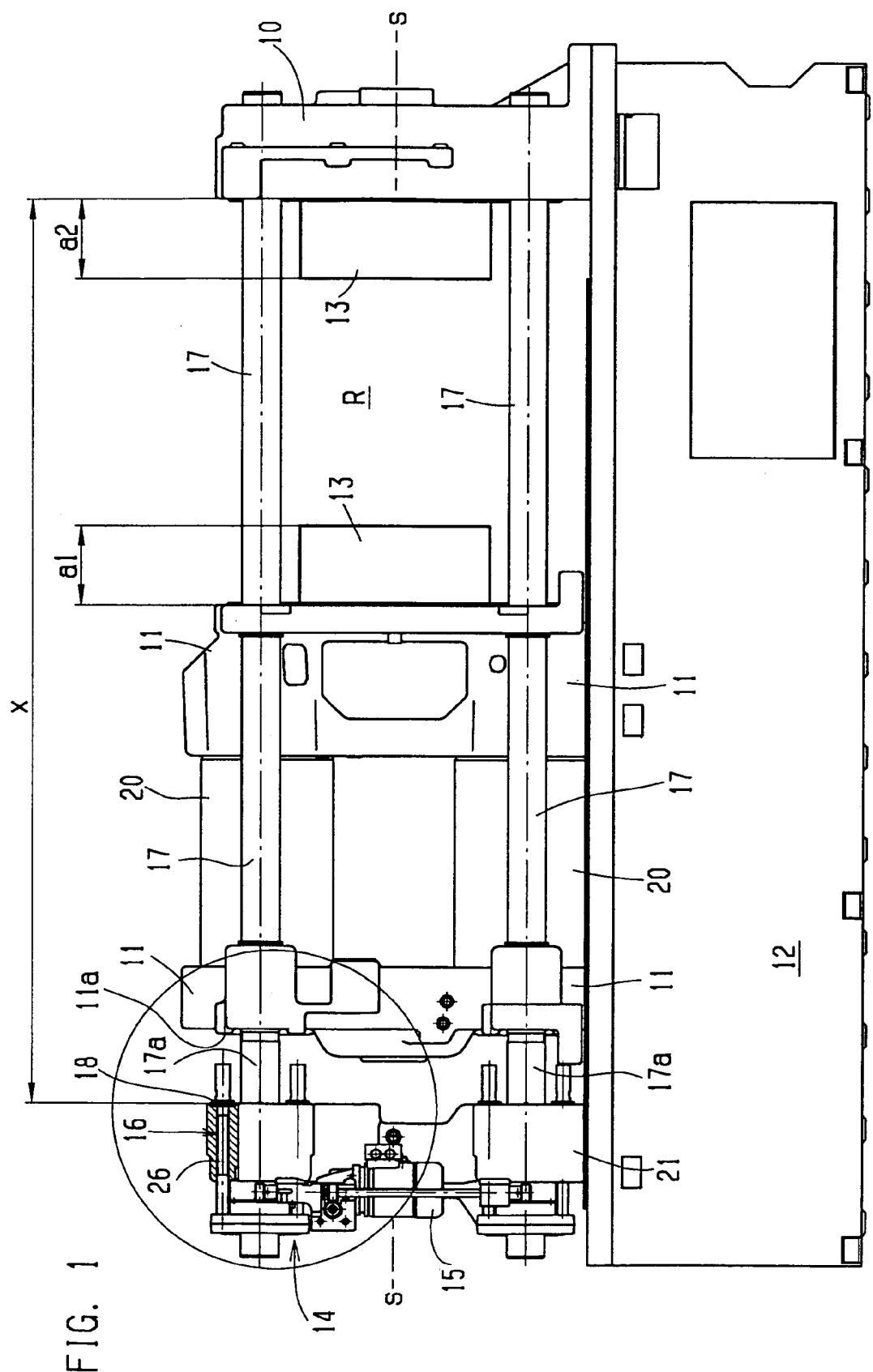

The present invention claims the priority of German patent application 102 10 869.2, filed on Dec. 3, 2002, the disclosure content of which is hereby expressly also made the object of the present application.

FIELD OF THE INVENTION

The invention relates to a mold closing unit for an injection molding machine for processing plastics materials and other plasticizable substances having a mold height adjustment.

STATE OF THE ART

This type of mold height adjusting means is known in DE 198 12 741 A1 to the extent that the mold closing unit can adjust the position of the supporting element in its own closing device. To this end, a locking device is provided respectively on the movable mold carrier and also on the supporting element for the closing device. In the standard condition for the production process, the supporting element is locked and the movable mold carrier is released for displacement, that-is-to-say is unlocked. If the height of the mold has to be changed, the movable mold carrier is locked and the supporting element released, such that when the closing device is activated, the position of the supporting element can be altered. This type of apparatus, however, from a certain size of machine, is no longer suitable for displacing the supporting element uniformly without canting.

U.S. Pat. No. 4,281,977 A makes known a mold height adjusting means, where, threaded portions, which are connected to nuts, are provided on columns, which are mostly secured to the stationary mold carrier and serve as a guiding means for the movable mold carrier. These nuts are driven via a separate driving means for adjusting the height of the mold. On the outside of these nuts there is an annular gear, which means that they can be actuated either by means of an annular gear or by means of a toothed belt.

For adjusting the height of the mold and locking a supporting plate for the closing mechanism, it is known from Engel Vertriebs GmbH, A-4311 Schwertberg, Austria, 1996, to provide columns with grooves and to clamp securedly two half-nuts to these grooves by moving the half-nuts towards one another in the radial direction until they abut against the grooved region of the guide columns.

Husky Injection Molding Systems, Moduline E-Series Machines, September 1996, made known this type of locking means with a bayonet closure. The column, for this purpose, has regions in which a closing piston can engage, as well as regions along which the closing piston, which is displaceable radially on the guide columns, can slide. Rotating this closing piston effects a positive engagement, which means that, at the same time, at least a portion of the closing force can also be applied to this piston.

SUMMARY OF THE INVENTION

Proceeding from this state of the art, an exemplary embodiment of the invention is a mold height adjustment for a mold closing unit and a method for actuating the mold height adjustment, which mold height adjustment uses in an advantageous manner for its actuation the moving parts which are present in any case on the machine.

The mold closing unit and the method are configured in such a manner that a release position is provided for the movable mold carrier internally of its displacement region, in which release position the mold carrier, as soon as it is transferred into this position, can actuate the locking device, that-is-to-say can unlock it. This leads to a relatively simple unlocking procedure as the mold carrier only has to be transferred into this region again and can subsequently adjust the supporting element. If the movable mold carrier is not situated in this region, the supporting element is automatically locked. Therefore, additional costly sensors or transferring mechanisms do not have to be provided. The construction of the locking device can be arbitrary if it is ensured that the movable mold carrier, as soon as it is in the release position, effects the unlocking of the locking device of the supporting element.

SHORT DESCRIPTION OF THE FIGURES

Figure 2:
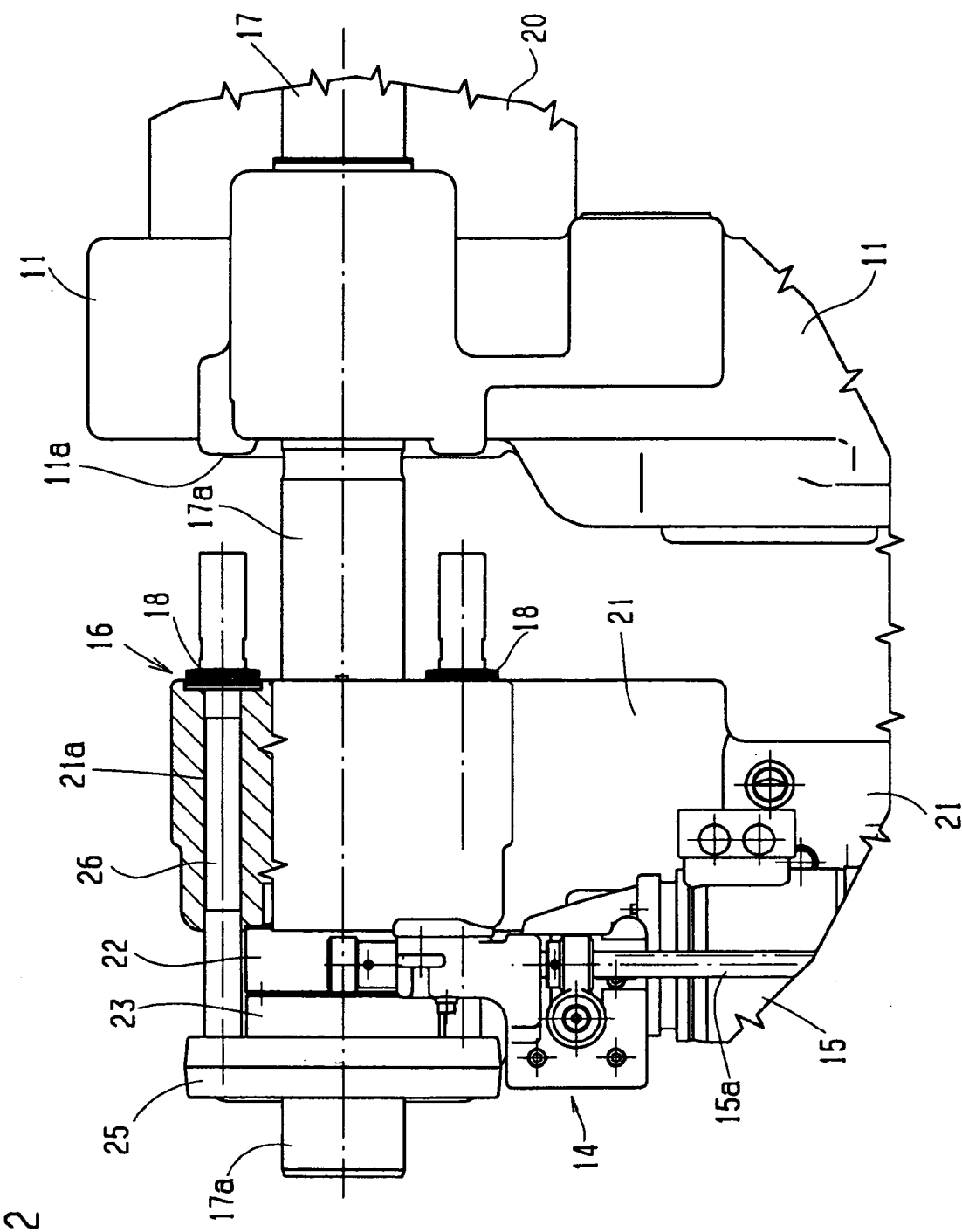
Figure 3:
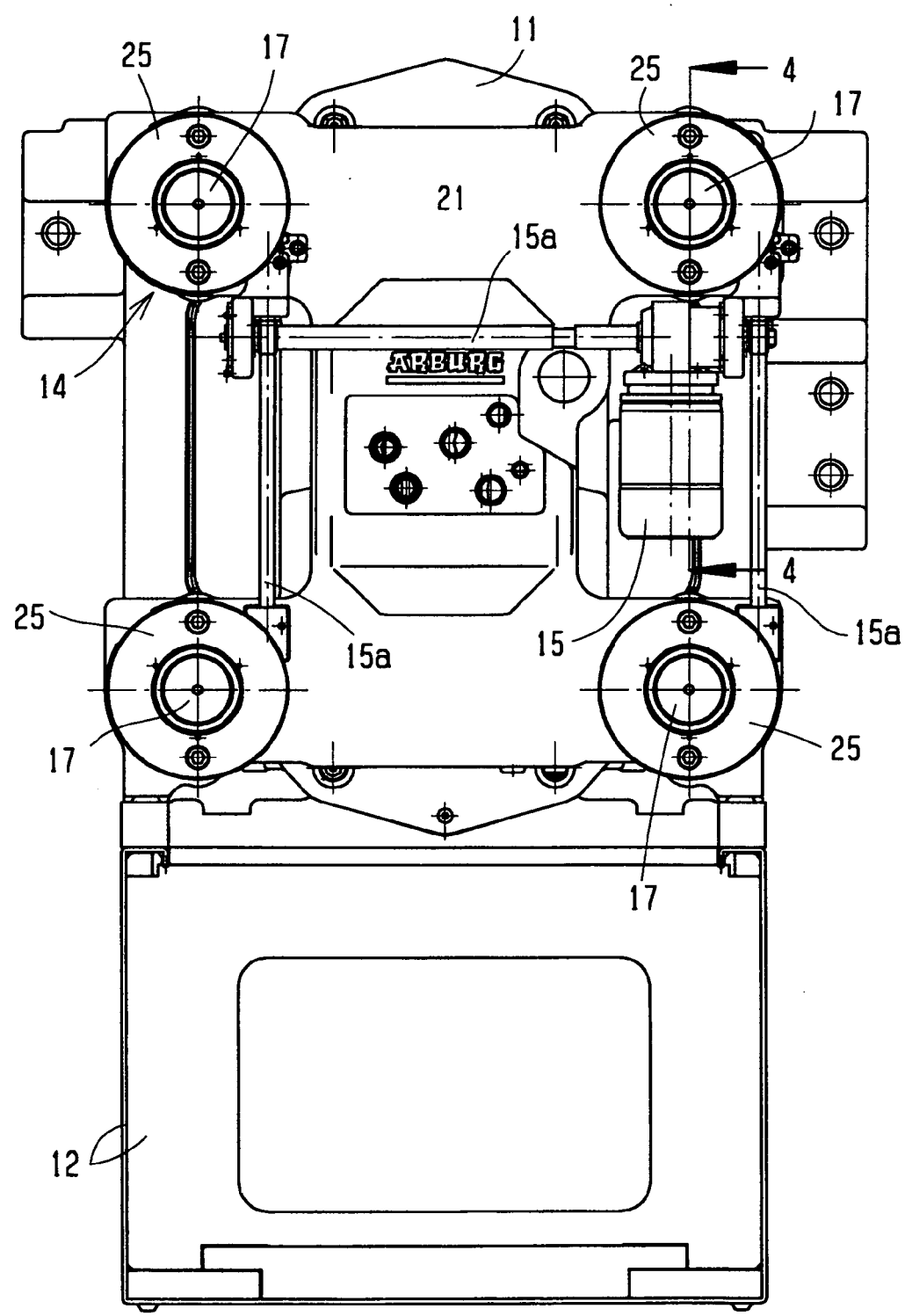
Figure 4:
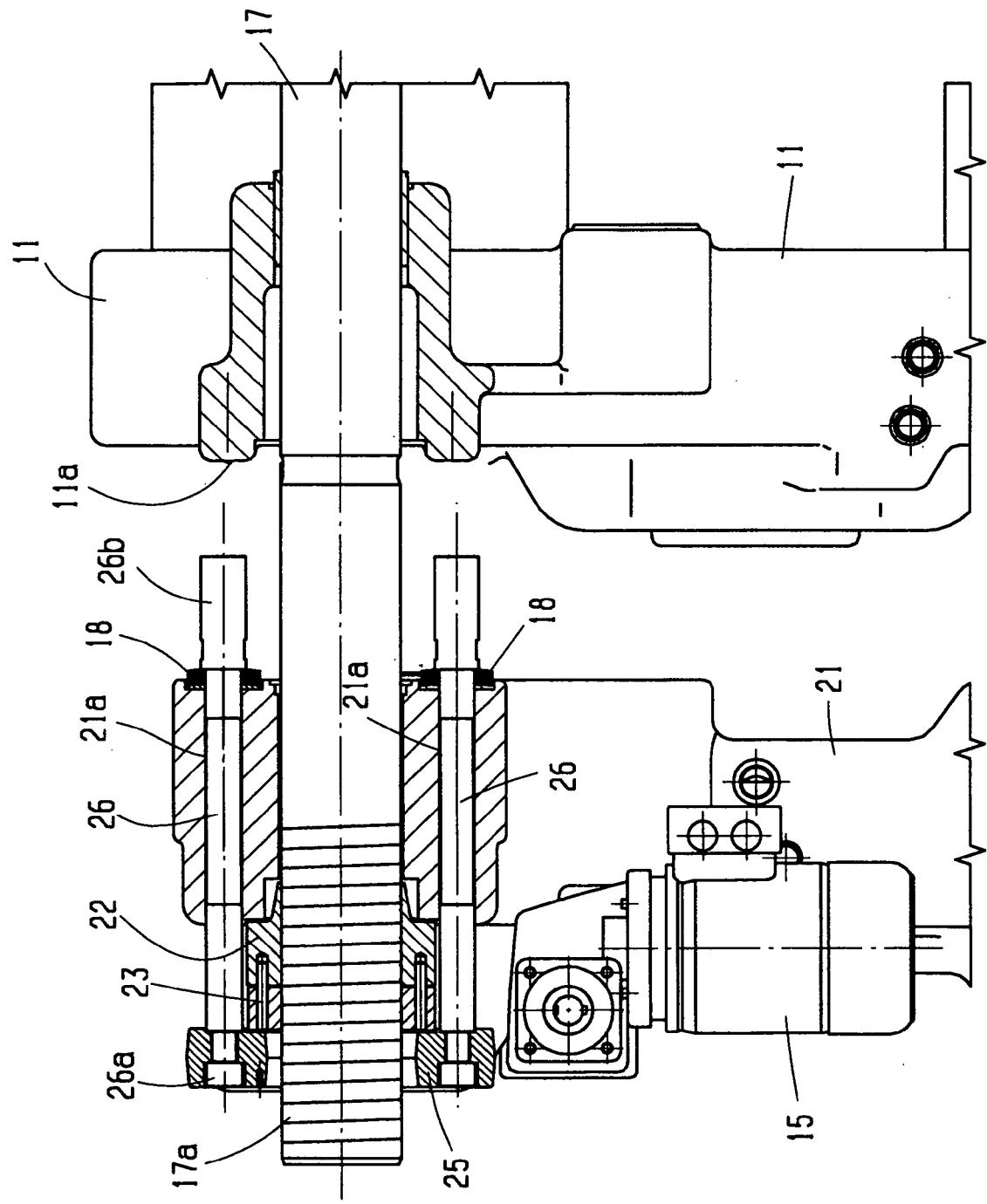

The invention is described in more detail below by way of an exemplified embodiment. In which:

FIG. 1 is a side view of a mold closing unit for an injection molding machine, FIG. 2 is an enlarged cutout from FIG. 1 in the region of the locking device, FIG. 3 is a rear view of the injection molding machine in FIG. 1 from the left, FIG. 4 is a view according to the lines 4—4 in FIG. 3 with a section through the locking device.

DETAILED DESCRIPTION OF PREFERRED EXEMPLIFIED EMBODIMENTS

The invention is now described in more detail below in an exemplary manner with reference to the enclosed drawings. However, the exemplified embodiments are only examples, which are not meant to restrict the inventive concept to one specific arrangement.

FIG. 1 shows the side view of a mold closing unit for a plastic injection molding machine, which can be used for processing plastics materials and other plasticizable substances such as powdery or ceramic substances. The mold closing unit is disposed on the machine base 12 and includes a stationary mold carrier 10 and a movable mold carrier 11. Injection molds 13 of variable height can be disposed between the mold carriers in a mold clamping area R. The height of the mold overall is the measurement that is produced from the sum of the measurements $a_1$ and $a_2$. The movable mold carrier 11 is constructed in the form of a frame, which includes, as shown in FIG. 1, the right-hand plate, to which the one half of the injection mold 13 is securable, and a rear plate, said plates being interconnected via the cylinder of the closing device 20. This produces a box plate, which is actuated by the pistons (not represented in the drawing) of the closing device. These pistons are supported conventionally on the supporting element 21. However, electromechanical drives or linear drives or other driving means can also be provided in place of the described hydraulic or pneumatic piston cylinder units in the form of the closing device 20.

In the exemplified embodiment, guide elements 17 are provided in the form of guide braces or guide columns, which are mounted on the stationary mold carrier 10. They serve, in the exemplified embodiment, both the movable mold carrier 11 and the supporting element 21 as guiding means for their movement, which has yet to be described. In principle, the mold height adjustment described below can also be used on an injection molding machine without braces, where the stationary mold carrier and the movable mold carrier are interconnected via a force transferring element, for example one or several brackets, guided around the mold clamping area R. In this case, only one corresponding displacement region for the supporting element has to be made possible, this latter then having to be guided in a suitable manner, for example, at one end of the bracket.

Associated with the supporting element 21 is a mold height adjustment 14, which serves for adjusting the distance x between the stationary mold carrier 10 and the supporting element 21 by moving the supporting element. The closing device can be optimized by changing the mold height. If, with a small injection mold 13, the supporting element in FIG. 1 is displaced to the right, the cycle times are initially reduced, as the movable mold carrier does not have to open the mold to the same extent as, for example, represented in FIG. 1. However, the path of the closing device can also be optimized by the adjustment, that-is-to-say, for example, can be minimized in the case of a small injection mold, which means that the pressure build-up times can be drastically reduced. The advantage this produces can contribute to a reduction in cycle times of several $^{1}/_{10}$ seconds.

In order to enable an automatic mold height adjustment, a drive 15 is provided, which can be seen best in FIG. 3. The drive 15 actuates, via changeover mechanisms (not represented in the drawings), various spindles 15a, which in their turn, are in engagement with the mold height adjustment 14 associated with each column 17. As soon as the mold height adjustment is unlocked by transferring the movable mold carrier 11 into the release position, the mold height adjustment can be actuated via the drive 15 and the spindles 15a at each of the guide elements 17 at the same time.

In order to ensure that the supporting element is reliably retained at the columns, when the not inconsiderable forces of the closing device 20 are applied during the injection molding cycle, a locking device 16 is provided for locking the supporting element 21 in its respective position. The effect and actuation of the locking device is described in more detail below by way of FIGS. 2 and 4.

For actuating the locking device, there is provided a release position in the displacement region of the movable mold carrier 11, which release position effects the unlocking of the locking device 16 when the movable mold carrier 11 is in the release position. In principle, therefore, there is no need for any additional sensors, the transferring of the movable mold carrier into the release position simply ensures that the locking device is unlocked, such that subsequently the drive 15 of the mold height adjustment 14 can adjust the supporting element 21 by changing the distance x. This release position is provided externally and at the end, which is remote from the stationary mold carrier 10, of the displacement region of the movable mold carrier 11, which displacement region is necessary during the actual injection molding process. If, therefore, after conclusion of the production of a certain injection molding, a mold height adjustment is to be executed, the movable mold carrier "overtravels" the previously admitted displacement region and is brought into the release position. In this release position are provided auxiliary means that make sure that the locking device 16 can be unlocked. In this case, the unlocking procedure must not be carried out as below; instead of the bolts 26 yet to be described and the resilient means 18, lever mechanisms or similar can also be provided, which are only to ensure that the existing locking is released. The mold height adjustment 14 itself is disposed on the supporting element 21. As shown in FIGS. 2 and 4, it includes nuts, which engage with threaded portions 17a on the guide elements 17 for the supporting element 21. If the drive 15 is actuated, these nuts are driven via the spindles 15a.

In the exemplified embodiment, there are preferably provided on each guide element at least two nuts 22, 23, which are clamped as a consequence of the effect of the resilient means 18 of the locking device 16. The nuts 22, 23 abut against the clamping sleeve 25 on one side and against the supporting element 21 on the other side, both being in operative connection with one another by means of connecting means 26 mounted thereon and clamping the nuts 22, 23 under the effect of the resilient means 18. In place of the counter nut solution given in this case, just one nut can also work as long as the nut is secured correspondingly in its respective position in another manner. However, the advantage of the following solution is that the effect of the nuts and the effect of the locking device, although they work in the direct vicinity of one another, are separate from one another. The clamping effect, in this regard, is provided, for example, by resilient means, which the movable mold carrier makes inoperative in the release position. Consequently, it is not necessary to release the clamping manually in order subsequently to be able to move the supporting element, but rather the adjustability of the supporting element is provided as soon as the effect of the resilient means is lifted by the movable mold carrier.

The connecting means 26 are bolts, which penetrate a bore 21a of the supporting element. Spring washers in the form of resilient means 18 are mounted between bolts and clamping sleeve 25 or—as in the exemplified embodiment—supporting element 21. FIG. 4 shows that the bolt 26 is secured to the clamping sleeve 25 with a screw 26a and abuts against the supporting element 21 by means of the resilient means 18. This is achieved in that the bolt, at the end remote from its head 26a, has a region 26b with a larger diameter, which serves the resilient means 18 as a bearing arrangement. Other suitable resilient means can be provided in place of the spring washers, as long as they are actuatable by means of the transferring of the movable mold carrier into its release position.

The connecting means 26, that-is-to-say the bolts, project in the direction of the movable mold carrier as far as into the region of the release position. The movable mold carrier 11, in its turn, has an actuating face 11a, which, in the release position of the movable mold carrier, actuates the connecting means 26 by lifting the locking effect of the resilient means 18. If, therefore, the movable mold carrier in FIG. 4 is moved further to the left, the actuating face 11a comes to abut against the bolt. If the movable mold carrier is moved even further to the left, the bolt is pressed to the left in opposition to the force of the resilient means 18, which means that the clamping effect between the nuts 22 and 23 is lifted. The nuts are clamped in a known manner by means of radial locking pins, the effect of which is also lifted when the effect of the resilient means 18 is lifted. It is then possible for the drive 15 to adjust the nuts. The actuating face 11a is disposed in the region of a bore of the movable mold carrier, which bore is passed through by the guide elements 17 which are in the form of guide columns.

As soon as the movable mold carrier 11 actuates the resilient means 18, the movable mold carrier abuts against the resilient means 18 with a large part of its surface area. As this abutting is effected through a movement along the guide elements 17, the force consequently is introduced in a substantially linear manner onto the resilient means 18 and the nuts 22, 23. At the same time, there is a closed force flow between the movable mold carrier 11 and the supporting element 21. This means that the forces are applied in a torque-free manner, which means that there is no canting when the supporting element 21 is adjusted. The adjusting is effected in an almost friction-free manner. Further additional auxiliary means are not necessary.

In principle, it must be ensured that the movable mold carrier remains in its conventional displacement region during the production process and does not pass into the release position. To this end, the clamping bolts, which are present in any case, are guided through the supporting element, which means that they project as far as into the region of the release position. If the movable mold carrier is then transferred into this region, the desired solution is produced.

The following steps are necessary for adjusting the mold height:
- Releasing the supporting element 21 from its position, which was coordinated with the previous mold height, by opening the locking device 16,
- Changing the distance x between the stationary mold carrier and the supporting element 21 by moving the supporting element 21 by means of the drive 15,
- Securing the supporting element 21 in the amended position, which is coordinated with the new mold height, by locking the locking device 16.

The releasing of the supporting element 21 is effected by the movable mold carrier 11 being transferred into the release position. The transferring into the release position effects the unlocking of the locking device 16. The movable mold carrier 11 is preferably transferred into this position by means of its own closing device 20, which means that no means other than the closing device, which is present in any case, are necessary for this purpose. Whilst the distance x is being changed, the supporting element 21 and the movable mold carrier 11 are moved together. There should therefore be coordination between the effect of the closing device 20 and the drive 15.

To change the distance x or respectively the mold height, the drive 15 actuates the nuts 22, 23 and adjusts them along the threaded portions 17a of the guide elements 17. However, this is not possible until the nuts, which have been checked in principle by the effect of the resilient means 18 of the locking device 16, are un-checked. The movable mold carrier 11, therefore, brings the connecting means 26, in opposition to the force of the resilient means 18, into a position, which enables a lifting of the checking effect.

It is obvious that this description can be subject to the most varied modifications, changes and adaptations, which are considered as equivalent to the enclosed claims.

The invention claimed is:

1. Method for automatically adapting the mold height of injection molds of variable height measured in closing direction on an injection molding machine for processing plastics materials and other plasticizable materials, the mold closing unit having:
    a stationary mold carrier,
    a movable mold carrier,
    a supporting element for a closing device for moving the movable mold carrier towards the stationary mold carrier and away from the stationary mold carrier,
    a mold height adjustment,
    a drive for adjusting the mold height,
    a locking device for locking the supporting element in its respective position,
    the method comprising:
    releasing the supporting element from a position coordinated with a first mold height by opening the locking device;
    changing a distance between the stationary mold carrier and the supporting element by moving the supporting element by means of the drive; and
    securing the supporting element in a second position, coordinated with a new mold height by locking the locking device,
    wherein the movable mold carrier, in a release position for releasing the supporting element, unlocks the locking device.

2. Method according to claim 1, wherein the movable mold carrier is transferred by the closing device into a position for actuating the locking device.

3. Method according to claim 2, wherein the position for actuating the locking device is at an end remote from the stationary mold carrier of an injection displacement region of the movable mold carrier required for an injection molding process.

4. Method according to claim 1, wherein during the changing of the distance, supporting element and movable mold carrier are moved together.

5. Method according to claim 1, wherein, for changing the distance, the drive actuates nuts and adjusts them along threaded portions, which, in the secured condition, are checked by the locking device.

6. Method according to claims 5, wherein when the movable mold carrier approaches the supporting element, it releases resilient means and lifts the checking effect between the nuts.

7. Method according to claims 6, wherein, through the movement of the movable mold carrier into the release position along guide elements, the force for lifting the effect of resilient means is introduced to the resilient means in a substantially linear manner.

8. Mold closing unit having an apparatus for automatically adapting to the mold height of injection molds of variable height measured in closing direction for an injection molding machine for processing plastics materials and other plasticizable substances, the mold closing unit comprising:
    a stationary mold carrier;
    a movable mold carrier;
    a closing device for moving the movable mold carrier in the closing direction towards the stationary mold carrier and away from the stationary mold carrier;
    an injection mold of variable height measured in the closing direction, said injection mold being accomodatable in a distance between the stationary mold carrier and the movable mold carrier;
    a supporting element for the closing device;
    a mold height adjustment for adjusting the distance between stationary mold carrier and supporting element by moving the supporting element;
    a drive for automatically adjusting the mold height adjustment;
    a locking device for locking the supporting element in its respective position,
    wherein a release position is provided in the displacement region of the movable mold carrier, the release position effecting the unlocking of the locking device when the movable mold carrier is in the release position.

9. Mold closing unit according to claim 8, wherein the release position is externally of and at the end, which is remote from the stationary mold carrier, of an injection displacement region of the movable mold carrier, which injection displacement region is required for an injection molding process.

10. Mold closing unit according to claim 8, wherein the mold height adjustment is disposed on the supporting element.

11. Mold closing unit according to claim 8, wherein the mold height adjustment includes nuts, which engage by means of threaded portions on guiding elements for the supporting element and are adjustable by means of the drive.

12. Mold closing unit according to claim 11, wherein at least two nuts in each case are clamped as a result of the effect of resilient means of the locking device.

13. Mold closing unit according to claim 11, wherein the nuts abut against a clamping sleeve and the supporting element, both of which are in operative connection through connecting means mounted thereon and clamp the nuts under the effect of resilient means.

14. Mold closing unit according to claim 13, wherein the connecting means are bolts which penetrate at least the supporting element, and in that spring washers are provided as the resilient means and are mounted between the bolts and a clamping sleeve and/or the supporting element.

15. Mold closing unit according to claim 14, wherein the bolts are secured with a screw to the clamping sleeve and are mounted on the supporting element by means of the resilient means.

16. Mold closing unit according to claim 8, wherein at least one unlocker is mounted on the supporting element and projects in the direction of the movable mold carrier as far as into the region of the release position, and wherein the movable mold carrier includes an actuating face, which, in the release position of the movable mold carrier, actuates the unlocker by lifting the locking effect of a resilient means.

17. Mold closing unit according to claim 16, wherein the unlocker is a connecting means operatively connecting a clamping sleeve and the supporting element.

18. Mold closing unit according to claim 16, wherein the actuating face is disposed in the region of a guiding bore for guiding the movable mold carrier along the guide elements.

* * * * *